US009565659B1

(12) United States Patent
Bertz

(10) Patent No.: US 9,565,659 B1
(45) Date of Patent: Feb. 7, 2017

(54) WIRELESS BEACON FOR EMBEDDING IN BUILDING INFRASTRUCTURE

(71) Applicant: Sprint Communications Company L.P., Overland Park, KS (US)

(72) Inventor: Lyle T. Bertz, Lee's Summit, MO (US)

(73) Assignee: Sprint Communications Company L.P., Overland Park, KS (US)

(*) Notice: Subject to any disclaimer, the term of this patent is extended or adjusted under 35 U.S.C. 154(b) by 0 days.

(21) Appl. No.: 14/732,671

(22) Filed: Jun. 5, 2015

(51) Int. Cl.
*H04B 7/00* (2006.01)
*H04W 72/04* (2009.01)
*H02M 7/02* (2006.01)
*H02J 9/06* (2006.01)
*H04W 48/16* (2009.01)
*H04W 88/02* (2009.01)
*H04B 1/00* (2006.01)

(52) U.S. Cl.
CPC .............. *H04W 72/04* (2013.01); *H02J 9/061* (2013.01); *H02M 7/02* (2013.01); *H04W 48/16* (2013.01); *H04W 88/02* (2013.01)

(58) Field of Classification Search
CPC ........... H04W 48/16; H02J 9/061; H02M 7/02
USPC .............................................. 455/41.2, 90.3
See application file for complete search history.

(56) References Cited

U.S. PATENT DOCUMENTS

| 6,061,261 | A | 5/2000 | Chen et al. |
| 6,160,728 | A | 12/2000 | Peterson et al. |
| 6,362,987 | B1 | 3/2002 | Yurek et al. |
| 2009/0174569 | A1* | 7/2009 | Smith ................ H04B 3/542 340/8.1 |

OTHER PUBLICATIONS

Bertz, Lyle T., et al., Patent Application entitled Discovery of Services by Mobile Communication Devices Using a Service Registry Indexed by Wireless Beacons, filed Feb. 11, 2015, U.S. Appl. No. 14/619,667.

* cited by examiner

*Primary Examiner* — Lee Nguyen

(57) ABSTRACT

An electrical outlet faceplate. The electrical outlet faceplate comprises a plate, an alternating current to direct current (AC/DC) converter mechanically coupled to the plate, and a wireless beacon mechanically coupled to the plate and electrically coupled to the AC/DC converter. The wireless beacon is a radio transmitter that transmits an identification in a radio frequency signal that has an effective range of less than 20 meters. The electrical outlet face plate further comprises a wire electrically connected to the AC/DC converter at a first end of the wire, whereby, when a second end of the wire is electrically connected to a powered electrical outlet, the wire provides alternating current power to the AC/DC converter.

18 Claims, 3 Drawing Sheets

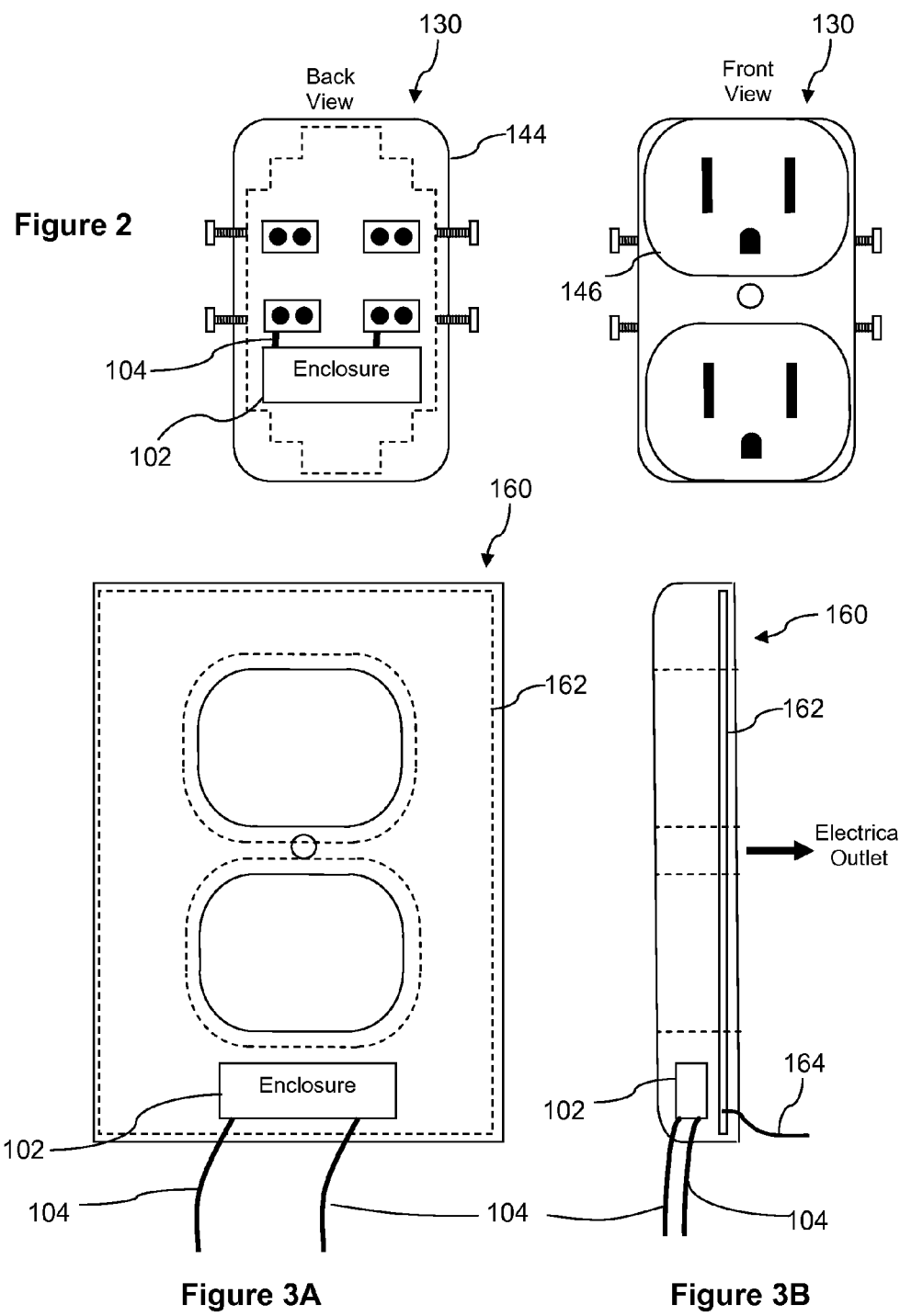

WIRELESS BEACON FOR EMBEDDING IN BUILDING INFRASTRUCTURE

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Mobile communication devices are providing more and more advanced functionality as the processing power of the devices increases. Applications or computer programs may be loaded onto the devices and executed to provide specialized functionality to the users of the devices. Some of the applications rely upon wireless communication to server computers that provide some of the information processing. The server computer may then transmit results or intermediate results to the device via a wireless communication link. The application on the device may then provide the results to the user or may complete the processing of the intermediate results received from the server computer. Wireless beacons can transmit an identity that may be used by a mobile communication device, in combination with a registry service, to discover and access services provided by server computers via wireless communication links.

SUMMARY

In an embodiment, an electrical outlet faceplate is disclosed. The electrical outlet faceplate comprises a plate, an alternating current to direct current (AC/DC) converter mechanically coupled to the plate, and a wireless beacon mechanically coupled to the plate and electrically coupled to the AC/DC converter. The wireless beacon is a radio transmitter that transmits an identification in a radio frequency signal that has an effective range of less than 20 meters. The electrical outlet face plate further comprises a wire electrically connected to the AC/DC converter at a first end of the wire, whereby, when a second end of the wire is electrically connected to a powered electrical outlet, the wire provides alternating current power to the AC/DC converter.

In another embodiment, a wireless beacon system is disclosed. The wireless beacon system comprises an alternating current to direct current (AC/DC) converter, a wireless beacon electrically coupled to the AC/DC converter, wherein the wireless beacon is a radio transmitter that transmits an identification in a radio frequency signal that has an effective range of less than 20 meters, and an enclosure that retains the AC/DC converter and the wireless beacon. The wireless beacon system further comprises an electrically conductive cantilever connected to the AC/DC converter that protrudes at least one inch from the enclosure, wherein the cantilever is configured to support the enclosure, AC/DC converter, and wireless beacon when an end of the cantilever is stabbed into a push-type connector of an electrical outlet.

In yet another embodiment, an electrical power outlet is disclosed. The electrical power outlet comprises a plug receptacle, a mounting bracket, a hot terminal, a neutral terminal, and an enclosure coupled to the plug receptacle and retaining the mounting bracket, the hot terminal, and the neutral terminal. The electrical power outlet further comprises an alternating current to direct current (AC/DC) converter retained by the enclosure and electrically coupled to the hot terminal and the neutral terminal and a wireless beacon retained by the enclosure and electrically coupled to the AC/DC converter, wherein the wireless beacon is a radio transmitter that transmits an identification in a radio frequency signal that has an effective range of less than 20 meters.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

FIG. 2 is a block diagram of another wireless beacon according to an embodiment of the disclosure.

FIG. 3A is a front view of an electrical outlet faceplate according to an embodiment of the disclosure.

FIG. 3B is a side view of an electrical outlet faceplate according to an embodiment of the disclosure.

DETAILED DESCRIPTION

Figure 1A:
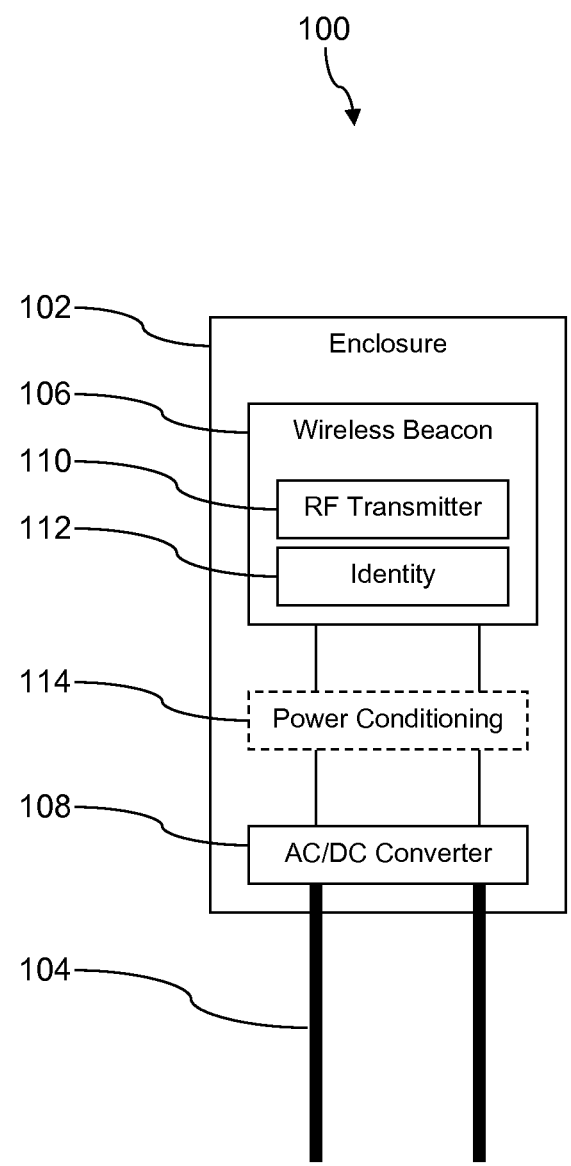
FIG. 1A is a block diagram of a wireless beacon according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

Wireless beacons may be used to promote dynamic discovery of services provided by a server computer. A wireless beacon is a short-range radio frequency transmitter that broadcasts an identity. For example, the wireless beacon may emit a radio frequency signal that has an effective range of 20 meters or less, 10 meters or less, or 5 meters or less. The wireless beacon may be proximate to but autonomous from the computer that provides the service identified by the beacon. Alternatively, the wireless beacon may be coupled to the computer that provides the service, for example the wireless beacon may be provided by a peripheral device of the server computer.

Alerted to the presence of the server computer by the beacon, mobile communication devices may attempt to connect to and access the services provided by the server computer. The mobile communication device, however, may not know what service is associated with a wireless beacon, for example when the user of the mobile communication device is traveling or when a new service is first deployed. A mobile communication device may be a mobile phone, a smart phone, a personal digital assistant (PDA), a media player, a wearable computer, a headset computer, a laptop computer, a tablet computer, or a notebook computer.

The mobile communication device may receive the identity signal transmitted by a wireless beacon and request a service registry to provide information about a service that may be associated with the wireless beacon. The service registry may look up a server computer and/or service based on the identity signal, retrieve information about services supported by the server computer and access tokens that may be used to request the services. The service registry may return the information to the mobile communication device, and the mobile communication device may request service from the server computer based on the received information. For more details about service registries for server computers associated with wireless beacons, see U.S. patent application Ser. No. 14/619,667, filed Feb. 11, 2015, entitled "Discovery of Services by Mobile Communication Devices Using a Service Registry Indexed by Wireless Beacons," by Lyle T. Bertz, et al., which is incorporated by reference herein in its entirety. It is understood that once the service offered by the server computer associated with the wireless beacon and the access tokens are known, the mobile communication device may store the identification of the service and the access tokens in memory, indexed by the wireless beacon identity, such that in the future when the wireless beacon identity is received, the mobile communication device can look this information up in its local storage and not rely upon the service registry.

It may be desirable for wireless beacons to be statically located and powered for an extended period of time. Known wireless beacons are powered by expendable batteries that do not remain powered for an extended period of time (for example, remain powered for five years or less). But in some implementations, for example in a private residence, a service life of a wireless beacon may be twenty years or more. Additionally, known wireless beacons may be adhered to walls or interior trim and may be removed or dislodged and lost. The present disclosure teaches a wireless beacon that is powered off alternating power electrical mains and that is retained out of view and away from brushing or scraping actions that might displace the wireless beacon.

In an embodiment, a wireless beacon system comprises an alternating current to direct current (AC/DC) converter, a wireless beacon, and stiff wires. The stiff wires (e.g., 14 gauge solid wire) are configured to plug into quick connect ports of standard electrical power outlets and provide AC power to the wireless beacon system. The AC/DC converter derives direct current power from the AC power received from the stiff wires and delivers the DC power to the wireless beacon. The wireless beacon uses the DC power to energize and to transmit the identity configured in the wireless beacon.

The stiff wires hold the wireless beacon system at a standoff distance from the electrical power outlet, supporting the wireless beacon system in a mechanical cantilever action. This standoff distance reduces the vulnerability of the AC/DC converter and/or the wireless beacon from noise emitted by the connection of the power mains to the electrical power outlet. For example, in some circumstances the large voltage levels associated with the AC power mains connected to an electrical power outlet may emit substantial electromagnetic interference, at least within close proximity to the AC power mains and the connection point made with the electrical power outlet. In an embodiment, the wireless beacon directs a main beam of an antenna pattern of the wireless beacon away from the electrical power outlet and/or the point where the AC power mains connect to the electrical power outlet, thereby reducing the interference of the AC power mains electromagnetic emissions with reception of the wireless beacon identity signal. In an embodiment, when properly installed, the main beam of the antenna pattern of the wireless beacon is directed away from a faceplate of the outlet and towards the back of a connection box in which the wireless beacon system and the electrical power outlet may be installed. The wireless beacon system can be used with already completed buildings as a retrofit. For example, the wireless beacon is configured to direct a main lobe of the antenna of the wireless beacon 106 away from the electrical power outlet.

In another embodiment, the wireless beacon system is embedded within the electrical power outlet. The AC/DC converter is connected to power buses within the electrical power outlet, for example one power lead of the AC/DC converter is connected to a hot lead and the other power lead of the AC/DC converter is connected to a neutral lead of the electrical power outlet. In an embodiment, the wireless beacon system embedded within the electrical power outlet has a radio frequency transmission line that connects to an antenna embedded in a faceplate that is installed to cover the electrical power outlet or to an antenna which is an integral part of the faceplate, for example a patch antenna or patch antenna array incorporated into an external surface of the faceplate.

In another embodiment, the wireless beacon system is embedded within a faceplate for use with an electrical power outlet. The wires that connect to the AC/DC converter in the faceplate embedded beacon system in this case may not be stiff as they have no role to play in supporting the wireless beacon system by cantilever action. Prior to attaching the faceplate, the wires that connect to the AC/DC converter are connected to the AC power mains via the electrical outlet. The connections may be made by screwing down an end of the wire to a terminal with a terminal screw or by sticking the end of the wire into a quick connect of the electrical power outlet. In an embodiment, an antenna of the wireless beacon system may be located on an exposed surface of the faceplate.

Each of these three different embodiments of the wireless beacon system are suitable for long term use without replacing batteries. These wireless beacon systems may be said to be embedded in infrastructure, for example embedded in the infrastructure of the building in which they are located. Additionally, each of the wireless beacon systems is safe from being scraped off a wall or falling off a wall (due to failed adhesive) and being lost. In an embodiment the wireless beacon system may have a rechargeable battery that draws power from the AC/DC converter and may deliver power to the wireless beacon system in the event mains electrical power is lost, for example during a power outage. But in some embodiments there is no battery backup for the wireless beacon system. In some use cases, if electrical mains power is lost, the services provided by a server computer proximate to the wireless beacon system may be unavailable and hence the utility of the wireless beacon system promoting discovery of services provided by the server computer may be without purpose.

Figure 1B:
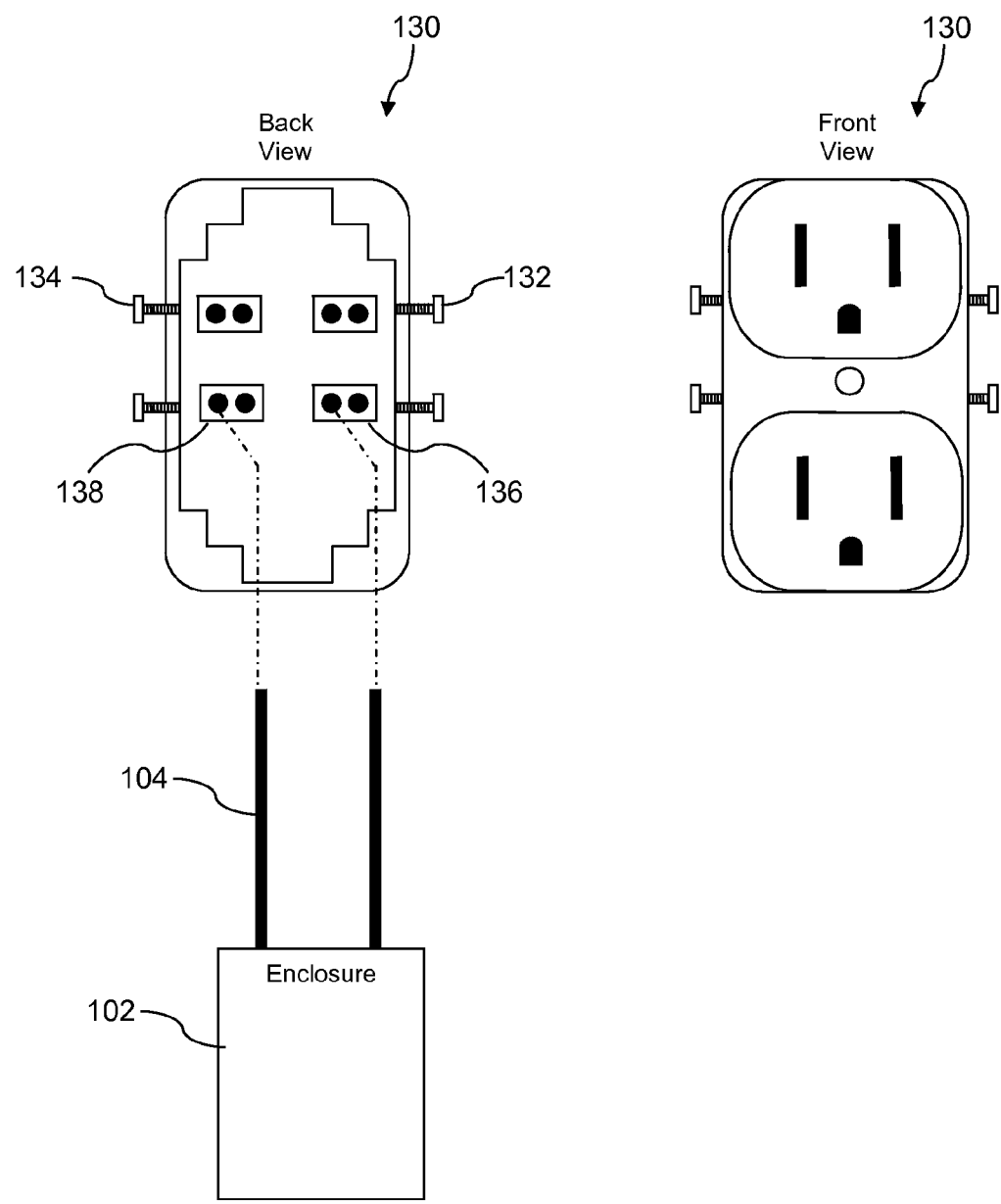
FIG. 1B is an illustration of an installation of a wireless beacon according to an embodiment of the disclosure.

Turning now to FIG. 1A and FIG. 1B, a wireless beacon system 100 is described. In an embodiment, the wireless beacon system 100 comprises an enclosure 102, one or more conductors 104, a wireless beacon 106, and an AC/DC converter 108. The wireless beacon 106 may comprise a radio frequency (RF) transmitter 110 and a stored identity 112. In an embodiment, the wireless beacon system 100 optionally comprises a power conditioning component 114 or components. In an embodiment, the wireless beacon 106 may comprise an RF transceiver instead of the RF transmitter 110.

In an embodiment in which the wireless beacon 106 only broadcasts the stored identity 112, the RF transmitter 110 may be sufficient and may be less expensive and/or smaller in size than an RF transceiver. In that embodiment, the stored identity 112 may be configured into the wireless beacon 106 at time of manufacturing. Additionally, the wireless beacon 106 may be configured to continuously broadcast the stored identity 112, for example at a periodic interval of once per second, once every 10 seconds, once per minute, once every five minutes, or some other periodic interval.

In another embodiment, however, the wireless beacon 106 may be provisioned with the stored identity 112 via a wireless communication link from an external transmitter to the wireless beacon 106, for example received by an RF transceiver of the wireless beacon 106. In an embodiment of the wireless beacon 106 that comprises an RF transceiver, the wireless beacon 106 may passively sample or receive radio signals, and when it infers that a wireless communication device is proximate (e.g., within the effective RF transmission range of the wireless beacon 106), transmits the stored identity 112 only when the proximate wireless communication device is detected. The wireless beacon 106 comprising a RF transceiver may not transmit the stored identity 112 when no device is detected in its proximity, thereby conserving power and/or reducing RF traffic. The wireless beacon 106 comprising a RF transceiver, when a wireless device is proximate, may periodically transmit the stored identity 112, for example every second, every ten seconds, every minute, every five minutes, or some other periodic interval. The wireless beacon 106 comprising a RF transceiver may continuously or periodically transmit the stored identity 112 whether a wireless communication device is detected to be proximate or not.

In some contexts the conductor 104 may be referred to as an electrically conductive cantilever, because the conductor 104 is preferably stiff and capable of supporting the weight of the enclosure 102 and enclosed components 106, 108, and optionally 114 at a stand-off distance by mechanical cantilever action. In an embodiment, the one or more conductor 104 is 14 gauge solid wire. The one or more conductor 104 may be insulated. In an embodiment, the one or more conductor 104 protrudes at least one inch from the enclosure 102. In an embodiment, the one or more conductor 104 protrudes at least 1½ inches from the enclosure or at least two inches from the enclosure 102.

The conductors 104 are electrically coupled or connected to the AC/DC converter 108. The AC/DC converter 108 provides DC power via electrical coupling to the wireless beacon 106. In an embodiment, the AC/DC converter 108 detects a polarity of the power input provided by the conductors 104 and flips the polarity when the conductors 104 are reverse polarized (e.g., when a hot conductor 104 is coupled to a neutral terminal and when a neutral conductor 104 is coupled to a hot terminal). In an embodiment, the wireless beacon system 100 comprises an indicator coupled to the wireless beacon 106 (e.g., a light emitting diode or other optical indicator) that indicates when the system 100 is powered and when it is not powered.

In an embodiment, a power conditioning component 114 receives the DC power from the AC/DC converter 108 and conditions that DC power before providing a conditioned DC power to the wireless beacon 106. The power conditioning component 114 may smooth the ripple of the DC power output that may be provided by the AC/DC converter 108 and may suppress or shunt power spikes or transients. The power conditioning component 114 may suppress or attenuate power surges.

The wireless beacon system 100 is contemplated to be used with standard electrical outlets such as a standard electrical outlet 130 best seen in FIG. 1B. The outlet 130 comprises a neutral (silver or bright) terminal screw and terminal 132, a hot (yellow or brass) terminal screw and terminal 134, one or more neutral quick connect sockets 136, and one or more hot quick connect sockets 138. Alternating current (AC) mains power may be connected to the terminals 132, 134 during installation of the electrical outlet 130 in a building. For example, a hot wire may be part of the electrical wiring infrastructure of a building and may be connected to the hot terminal screw and terminal 134, and a neutral wire may be part of the electrical wiring infrastructure of the building and may be connected to the neutral terminal screw and terminal 132. The AC mains power—the hot wire and the neutral wire—may extend back to an electrical circuit breaker box or other electrical connection box in the building, and that electrical circuit breaker box or connection box may be connected to an electrical power distribution grid, for example connected to an electrical power service provided by a commercial electrical power company.

In an embodiment, the electrical outlet 130 may comprise a grounding lug (not shown) or terminal screw to which a ground wire may be attached. In another embodiment, the electrical outlet 130 may comprise a metal frame having a threaded hole and a terminal screw to which a ground wire may be attached. The ground wire may be part of the electrical wiring infrastructure of a building and may connect to an electrical ground such as a copper pole driven into the ground, a metal pipe that extends into the ground, or another standard earth ground.

As illustrated in FIG. 1B, a first conductor 104 may be pushed into the neutral quick connect socket 136 and a second conductor 104 may be pushed into the hot quick connect socket 138. Alternatively, the first conductor 104 may be connected to the neutral terminal screw and terminal 132, and the second conductor 104 may be connected to the hot terminal screw and terminal 134. It is understood that the installation of the wireless beacon system 100 is to be performed when electrical power to the outlet 130 is turned off (a circuit breaker powering the circuit to which the outlet 130 is wired is open). Further, it is recommended that a licensed electrician perform the installation of the wireless beacon system 100.

Turning now to FIG. 2, an alternative embodiment of the wireless beacon system is described. In an embodiment, the electrical power outlet 130 embeds the electrical conductors 104, the enclosure 102, and the components it encloses (the AC/DC converter 108, the wireless beacon 106, and optionally the power conditioning component 114). The first electrical conductor 104 connects to the neutral terminal and the second electrical conductor 104 connects to the hot terminal. The electrical power outlet 130 further comprises a mounting bracket 144 for attaching the electrical power outlet 130 to a structural wall or to an electrical box and a plug receptacle 146. In the embodiment of the wireless beacon system shown in FIG. 2, the conductors 104 do not support the weight of the wireless beacon system in cantilever and do not maintain the wireless beacon system at a standoff distance. Consequently, the conductors 104 in the embodiment illustrated in FIG. 2 need not be still wires. The wireless beacon 106 in the alternative embodiment illustrated in FIG. 2 may also be configured to direct a main beam of an antenna radiation pattern away from the front of the electrical power outlet, away from the plug receptacle 146. For example, the wireless beacon 106 and/or the electrical outlet 130 embedding the wireless beacon 106 is configured to direct a main lobe of the antenna of the wireless beacon 106 away from the plug receptacle 146.

Turning now to FIG. 3A and FIG. 3B, an electrical outlet faceplate 160 is described. FIG. 3A is a view looking at the front of the electrical outlet faceplate 160, and FIG. 3B is a view looking at the side of the electrical outlet faceplate 160. In an embodiment, the faceplate 160 comprises the electrical conductors 104, the enclosure 102, and the components it encloses (the AC/DC converter 108, the wireless beacon 106, and optionally the power conditioning component 114). In the embodiment illustrated in FIG. 3A and FIG. 3B, the wireless beacon 106 may be configured to direct a main beam of an antenna radiation pattern out the front of the faceplate 160 and away from an electrical outlet over which the faceplate 160 may be installed. The electrical conductors 104 may be wired to screw posts of the terminals 132, 134 or may be pushed into the quick connect sockets 136, 138 of the of the electrical power outlet 130.

In an embodiment, the electrical outlet faceplate 160 may comprise a radio frequency shield 162 on a side of the faceplate 160 that is oriented towards an electrical outlet when the faceplate is installed over the electrical outlet. The shield 162 may reduce electromagnetic interference of the AC mains or the connection of the AC mains to the electrical outlet, for example interference with operation of the wireless beacon 106 or interference with reception of the wireless beacon signal radiated by the wireless beacon 106. The shield 162 may be electrically connected to a ground wire 164 that connects to a ground lug of the electrical outlet or to a metal frame of the electrical outlet. The shield 162 may comprise a thin metal foil, a thin perforated metal foil, or a mesh of interconnected wires. In an embodiment, an antenna of the wireless beacon 106 (not shown) may be disposed on a surface of the faceplate 160. For example, the antenna may be adhered to or laminated onto the faceplate 160. For example, the antenna may be molded into the faceplate 160 at time of manufacture of the faceplate 160.

In an embodiment, the enclosure 102 may be molded into the faceplate 160 when the faceplate is manufactured. Alternatively, the enclosure 102 may be retained within a hollow or concavity of the faceplate 160 by a backing that is adhered to the back of the faceplate 160 or retained by clips, snap-fits, detents, or secured otherwise to the faceplate 160.

A rechargeable battery may be incorporated into any of the three alternative embodiments of the wireless beacon system described above with reference to FIG. 1A and FIG. 1B, FIG. 2, FIG. 3A, and FIG. 3B. The rechargeable battery may receive DC power from the AC/DC converter 108. A rechargeable battery may provide power to the wireless beacon 106 when AC electrical power mains are not powered, for example during an electrical power outage. In other embodiments, however, the wireless beacon system does not comprise a rechargeable battery, for example when a server computer associated with the wireless beacon system may be out of service when AC electrical power mains are down.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A wireless beacon component, comprising:
   an alternating current to direct current (AC/DC) converter;
   a wireless beacon electrically coupled to the AC/DC converter, wherein the wireless beacon is a radio transmitter that transmits an identification in a radio frequency signal that has an effective range of less than 20 meters;
   an enclosure that retains the AC/DC converter and the wireless beacon; and
   an electrically conductive cantilever connected to the AC/DC converter that protrudes at least one inch from the enclosure, wherein the cantilever is configured to support the enclosure, the AC/DC converter, and the wireless beacon when an end of the cantilever is stabbed into a push-type connector of an electrical outlet.

2. The wireless beacon component of claim 1, wherein the electrically conductive cantilever is formed of 14 gauge solid wire.

3. The wireless beacon component of claim 1, wherein the wireless beacon is configured to direct a main lobe of an antenna radiation pattern of the wireless beacon away from the electrically conductive cantilever.

4. The wireless beacon component of claim 1, further comprising a battery electrically coupled to the wireless beacon, wherein the battery provides back-up power to the wireless beacon in the event the AC/DC converter is unpowered.

5. The wireless beacon component of claim 1, further comprising a power conditioning component electrically connected to the AC/DC converter and electrically connected to the wireless beacon, wherein when the AC/DC converter is powered from alternating current mains power via the electrical outlet, the power conditioning component provides conditioned direct current electrical power to the wireless beacon.

6. The wireless beacon component of claim 1, further comprising a second electrically conductive cantilever connected to the AC/DC converter that protrudes at least one inch from the enclosure.

7. The wireless beacon component of claim 6, wherein the AC/DC converter is configured to detect a polarity of alternating current electrical power delivered to the cantilevers and to flip the polarity of the delivered alternating current electrical power when the delivered alternating current electrical power is reverse polarized.

8. An electrical outlet faceplate configured to interface with a front face of an electrical outlet, comprising:

an alternating current to direct current (AC/DC) converter mechanically coupled to the electrical outlet faceplate;

a wireless beacon mechanically coupled to the electrical outlet faceplate and electrically coupled to the AC/DC converter, wherein the wireless beacon is a radio transmitter that transmits an identification in a radio frequency signal that has an effective range of less than 20 meters; and a wire electrically connected to the AC/DC converter at a first end of the wire, whereby, when a second end of the wire is electrically connected to the electrical outlet via at least one of a quick connect port of the electrical outlet and a screw terminal of the electrical outlet, the wire provides alternating current power to the AC/DC converter.

9. The electrical outlet faceplate of claim 8, wherein the electrical outlet faceplate defines a plurality of apertures to receive a plurality of electrical power receptacles located on the front face of the electrical outlet.

10. The electrical outlet faceplate of claim 8, wherein the wireless beacon is configured to direct a main lobe of an antenna radiation pattern of the beacon toward an outer face of the electrical outlet faceplate, where the outer face of the electrical outlet faceplate faces away from a wall in which the electrical outlet is located.

11. The electrical outlet faceplate of claim 8, further comprising a rechargeable battery electrically coupled to the wireless beacon, wherein the rechargeable battery provides back-up power to the wireless beacon in the event the AC/DC converter is unpowered, and wherein the rechargeable battery charges from the AC/DC converter when the AC/DC converter is powered.

12. The electrical outlet faceplate of claim 8, further comprising a power conditioning component electrically connected to the AC/DC converter and electrically connected to the wireless beacon, wherein when the AC/DC converter is powered the power conditioning component provides conditioned direct current electrical power to the wireless beacon.

13. The electrical outlet faceplate of claim 8, further comprising an optical indicator that is electrically coupled to the wireless beacon and is configured to radiate a visible light when the wireless beacon is powered, wherein the electrical outlet faceplate defines an aperture to receive at least a portion of the optical indicator.

14. An electrical power outlet, comprising:

a plug receptacle;

a mounting bracket;

a hot terminal;

a neutral terminal;

an enclosure coupled to the plug receptacle and retaining the mounting bracket, the hot terminal, and the neutral terminal;

an alternating current to direct current (AC/DC) converter retained by the enclosure and electrically coupled to the hot terminal and the neutral terminal; and a wireless beacon retained by the enclosure and electrically coupled to the AC/DC converter, wherein the wireless beacon is a radio transmitter that transmits an identification in a radio frequency signal that has an effective range of less than 20 meters, wherein the wireless beacon is configured to electrically couple to an antenna embedded within a faceplate external to the electrical power outlet, and wherein the faceplate couples to the mounting bracket via a front face of the mounting bracket and provides direct and unobstructed access to the plug receptacle.

15. The electrical power outlet of claim 14, further comprising a rechargeable battery electrically coupled to the wireless beacon and retained by the enclosure.

16. The electrical power outlet of claim 14, further comprising a power conditioning component electrically coupled between the AC/DC converter and the wireless beacon.

17. The electrical power outlet of claim 14, further comprising a light emitting diode electrically coupled to the wireless beacon.

18. The electrical power outlet of claim 14, wherein the wireless beacon is configured to direct a main lobe of an antenna radiation pattern of the beacon away from the plug receptacle.

* * * * *